United States Patent

Owaki

[11] Patent Number: 5,956,628
[45] Date of Patent: Sep. 21, 1999

[54] RECEIVING FOR RECEIVING FM TEXT-BASED MULTIPLEX BROADCASTS

[75] Inventor: Masanao Owaki, Kanagawa, Japan

[73] Assignee: Sony Corporation, Tokyo, Japan

[21] Appl. No.: 08/731,159

[22] Filed: Oct. 10, 1996

[30] Foreign Application Priority Data

Oct. 16, 1995 [JP] Japan .................................. 7-293622

[51] Int. Cl.⁶ ................................................ H04B 1/16
[52] U.S. Cl. .................................. 455/158.4; 455/158.5; 455/186.2; 370/486
[58] Field of Search ........................... 455/186.1, 186.2, 455/185.1, 158.1, 158.2, 158.3, 158.4, 158.5, 4.2, 38.1, 384.4; 370/486, 487

[56] References Cited

U.S. PATENT DOCUMENTS

5,497,372  3/1996  Nankoh et al. ................. 455/158.4 X
5,621,456  4/1997  Florin et al. ......................... 455/4.2 X

*Primary Examiner*—Wellington Chin
*Assistant Examiner*—Philip J. Sobutka
*Attorney, Agent, or Firm*—Jay H. Maioli

[57] ABSTRACT

A receiver for receiving FM text-based multiplex broadcasts has a receiving circuit for receiving FM text-based multiplex broadcasts, a memory for storing character data received by the receiving circuit and a display element, in which character data stored in the memory are displayed, assuming the display capacity of the display element to be one page, on the display element one page thereof at a time, and it is controlled so that the display of one page at a time is changed over automatically to a next page sequentially at every predetermined time.

4 Claims, 12 Drawing Sheets

| 16 BITS | 176 BITS | 14 BITS | 82 BITS |
|---|---|---|---|
| BIC1 | DATA PACKET 1 | CRC | PARITY |
| BIC1 | DATA PACKET 2 | CRC | PARITY |
| --- | ------------ | -- | ---- |
| BIC1 | DATA PACKET 13 | CRC | PARITY |
| BIC3 | DATA PACKET 14 | CRC | PARITY |
| BIC3 | DATA PACKET 15 | | PARITY |
| BIC4 | PARITY PACKET 1 | | PARITY |
| BIC3 | DATA PACKET 16 | CRC | PARITY |
| BIC3 | DATA PACKET 17 | CRC | PARITY |
| BIC4 | PARITY PACKET 2 | | PARITY |
| --- | ------------ | -- | ---- |
| BIC3 | DATA PACKET 94 | CRC | PARITY |
| BIC3 | DATA PACKET 95 | CRC | PARITY |
| BIC4 | PARITY PACKET 41 | | PARITY |
| BIC2 | DATA PACKET 96 | CRC | PARITY |
| --- | ------------ | -- | ---- |
| BIC2 | DATA PACKET 108 | CRC | PARITY |
| BIC3 | DATA PACKET 109 | CRC | PARITY |
| BIC3 | DATA PACKET 110 | CRC | PARITY |
| BIC4 | PARITY PACKET 42 | | PARITY |
| --- | ------------ | -- | ---- |
| BIC3 | DATA PACKET 189 | CRC | PARITY |
| BIC3 | DATA PACKET 190 | CRC | PARITY |
| BIC4 | PARITY PACKET 82 | | PARITY |

272 BLOCKS

| BIT | PRESENTATION CONTENTS |
|---|---|
| b 1 | CHARACTER DATA |
| b 2 | FIGURE DATA |
| b 3 | TRANSPARENT DATA |
| b 4 | UNDEFINED |
| b 5 | UNDEFINED |
| b 6 | UNDEFINED |
| b 7 | BATCH PROGRAM |
| b 8 | SUPPLEMENT PROGRAM |

FIG. 13A
```
FM-JBA  MIERURADIO  MAINMENU          ~50
1. PROGRAM INFORMATION
2. NEWS · SPORTS
```

FIG. 13B
```
FM-JBA  MIERURADIO  MAINMENU          ~50
3. WEATHER FORECAST
4. TRAFFIC INFORMATION
```

FIG. 13C
```
FM-JBA  MIERURADIO  MAINMENU          ~50
1. WEATHER TODAY
2. WEATHER TOMORROW
```

FIG. 13D
```
FM-JBA  MIERURADIO  WEATHER FORECAST  ~50
      TOKYO (TODAY)
   RAIN IT WILL SNOW AFTER
```

RECEIVING FOR RECEIVING FM TEXT-BASED MULTIPLEX BROADCASTS

BACKGROUND OF THE INVENTION

1. Field of the Invention

The present invention relates to a receiver for receiving text-based multiplex broadcasts.

2. Description of Related Art

For example, in Japan, FM broadcasts called "FM text-based multiplex broadcast" are realized in which character information data or the like are multiplexed and transmitted together with the original audio broadcast program.

Such FM text-based multiplex broadcast is called a Data Radio Channel (DARC) method, the development of which NHK Broadcasting Technology Research Institute has played a key role. The multiplexing standard for digital data such as character information is as follows: a subcarrier frequency of 76 kHz, a transmission rate of 16 kilobits per second, a modulation method of Level Controlled Minimum Shift Keying (LMSK), and an error correction method using a (272,190) compacted difference set cyclic code.

Program services such as character information can be classified into levels 1, 2 and 3. In all three cases, character information or the like is displayed using a dot display. In level 1, the information is provided as character information targeted as a service for a receiver capable of displaying 15.5 characters×2.5 lines, including a header. In level 2, the information is provided as characters or figures targeted as a service adopting a receiver capable of displaying 15.5 characters×8.5 lines, including a header. Level 3 is for traffic information services provided for receivers capable of displaying detailed maps from a CD-ROM (Compact Disc Read-Only Memory) or the like, namely, navigation systems.

Level 1 program services can be utilized for news, weather forecasts, traffic information, entertainment, main supplemental programs and the like. In this case, entertainment would include services providing fortune telling, messages from listeners, quizzes, town information and the like.

A main supplemental program provides information for supplementing a program such as the song name, performers name and telephone and fax numbers for requests when the original audio broadcast program is, for example, a music program. The main supplemental program will be hereinafter referred to as "program information" or "program linkage".

In addition to the above services, "emergency information" may also be provided as required at the time of emergencies.

Figure 5:
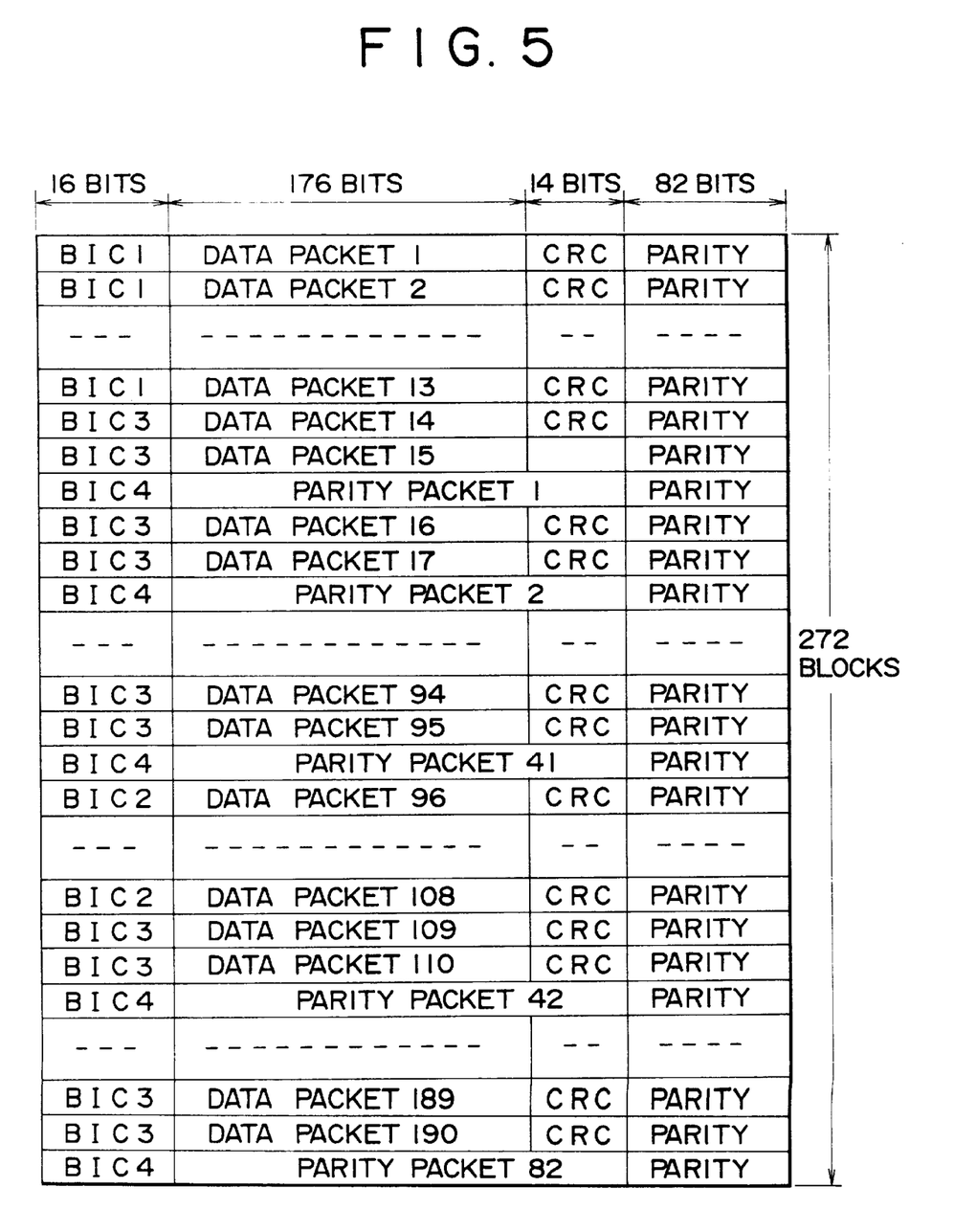
FIG. 5 is a diagram for explaining a signal format.

FIG. 5 shows the frame structure of an LMSK signal which is multiplexed in the FM text-based multiplex broadcast of a DRAC method. One frame of this LMSK signal is comprised of 272 blocks, with each block comprising 288 bits.

One frame comprising 272 blocks is divided into 190 data packet blocks and 82 vertical parity packet blocks, with the vertical parity packet blocks being distributed and transmitted in the frame.

A 16-bit Block Identity Code (BIC) is attached to the head of each block. Four kinds of BIC are used for distinguishing each of the parity packets, and thus the heads of the frame can be discerned.

The data packet block has a 176-bit data packet following the BIC, after which a 14-bit Cyclic Redundancy Check (CRC) code is added, followed by an 82-bit horizontal parity check code.

In this case, the CRC code is attached for detecting residual errors after error correction using a product code. The vertical parity packet block is provided to have a 272-bit vertical parity packet following the BIC.

Figure 6:
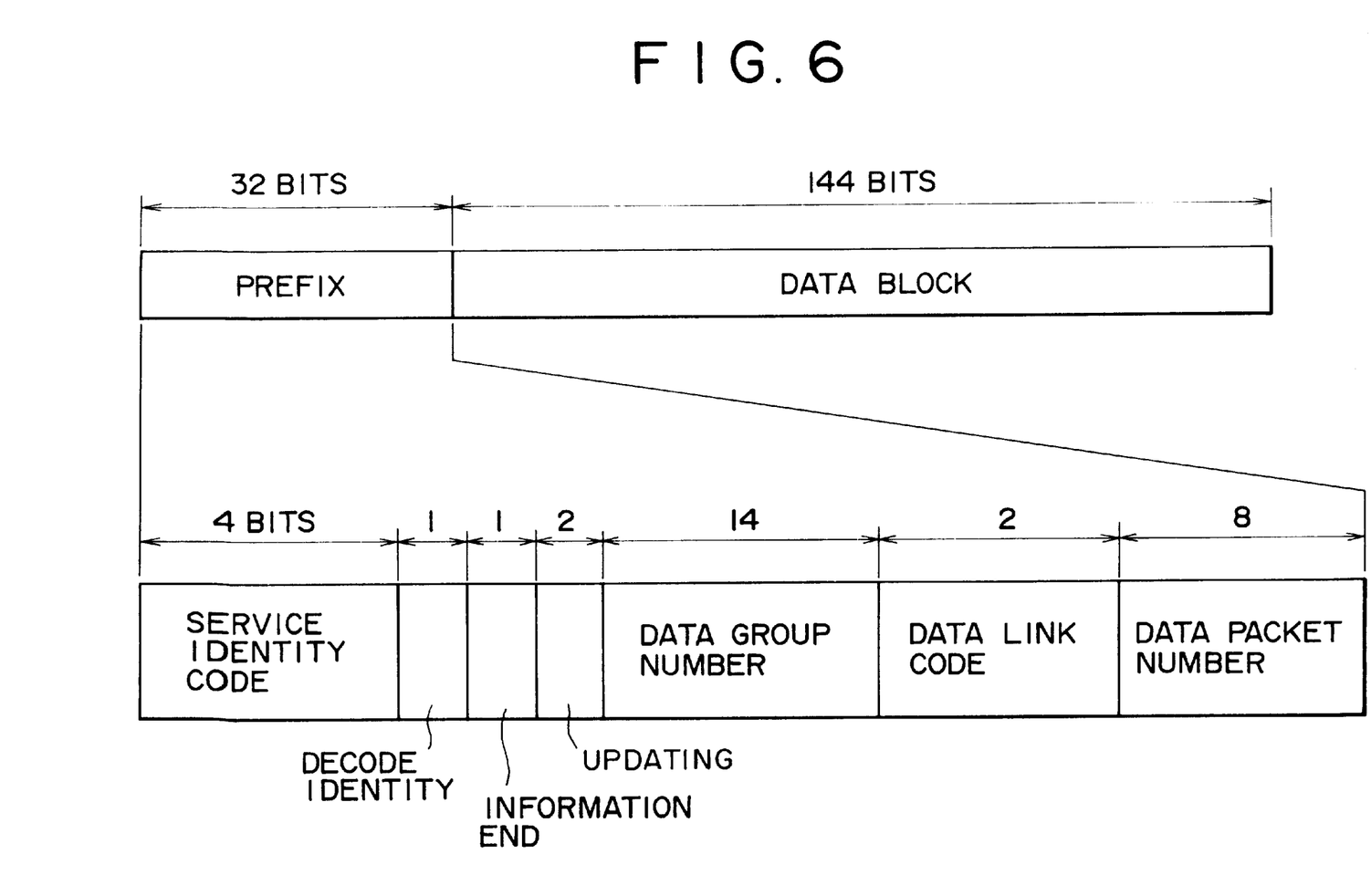
FIG. 6 is a diagram for explaining the signal format.

Each data packet comprises a 32-bit prefix followed by a 144-bit data block as shown in FIG. 6.

Furthermore, this prefix comprises a service identity code, a decode identity flag, an information end flag, a updating flag, a program number, a page number, a data link code and a data packet number, as shown in the lower portion of FIG. 6.

The service identity code consists of 4 bits and is for discerning the program contents and the like. Regarding level 1, "1" is general information for sequential reception processing, and "2" and "3" are general information for recording and reception processing.

In this case, the sequential reception processing is a mode for the receiver starting decoding processing for displaying on receipt of the first data packet of the program data or the page data. This sequential reception processing is carried out on the receiving side for a program where it is required to take timing of presentation on the receiving side or for a program where the information will not be displayed in time if the decoding processing is started after the last packet of the data group is obtained.

Further, recording and reception processing is a mode for not starting decoding processing for displaying until all of the data for the program data or the page data are received and recorded and then error correction is carried out using CRC code for every data group. Besides, the programs for performing this recording and reception processing include news, weather forecast, traffic information and so on.

In the prefix, the decode identity flag is one bit, and is "1" when the error correction circuit for the receiver outputs data by decoding in the horizontal direction only, and "0" when the data are outputted after decoding in the horizontal direction and the vertical direction.

Sequential reception processing, when the decode identity flag is "0", is defined in such a manner that decoding processing for displaying each of data packets is carried out at the time when the receiver receives the BIC at the head of the 302nd packet from the reception of the BIC at the head of respective data packets.

The information end flag is one bit and is "1" when transmission of a data group with a certain data group number is completed, and "0" when this is not the case. The updating flag is two bits, and is incremented by one every time a data group is updated. The program number is 8 bits, and the page number is 6 bits, with the data group number being formed using both of these items.

Furthermore, the program number is from 0 to 255, the "main menu" being assigned to "0" optional programs such as news and weather forecast being assigned to 1 to 253, the main supplemental program (program information or program linkage) being assigned to "254" and emergency information being assigned to "255".

Further, the page number is from 1 to 62, i.e., one program can have a maximum of 62 pages. One page corresponds to one to four of data groups, with one data group comprising one or a plurality of data blocks.

Furthermore, the data link code is 2 bits and is used for linking each group of the divided data group. When the data are so large that the number of the data packets belonging to one data group exceeds the maximum value of the data packet number, the data group is divided into a maximum of 4 groups with different data link codes. The data group is then transmitted with the divided groups of the same group number and different data link codes being linked in the order of the code numbers 0→1→2→3.

The data packet number is 8 bits long, and is aligned in sequence from "0". The data packet number indicates the sequence of the data packets in one program. That is, the data packet number indicates in which position the data packet is placed in one program.

At level 1, one page is usually displayed in the form of 15.5 characters×2.5 lines, but can also be displayed in the form of 15.5 characters×8.5 lines. Further, in this case, the character data are for displaying characters defined by Japanese Industrial Standard Code (JIS code).

On the other hand, as described above and as shown in FIG. 7A, one data group is made up of one or a plurality of data blocks of the data packet. In this case, the data blocks having equal service identity code, data group number and update flag arranged in the order of the data packet number from a data block having a data packet number 0 to a data block where an information end flag of the prefix is set form one data group.

Figure 7A:
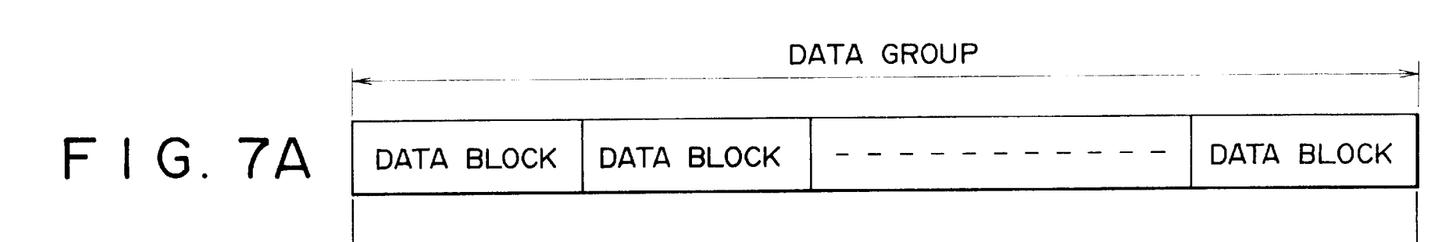
FIGS. 7A and 7B are diagrams for explaining the signal format.

Thus, the data group has the length integer times as long as 144 bits which is the length of the data block. Further, one data group corresponds to one display unit, i.e., display data in one page.

Figure 7B:
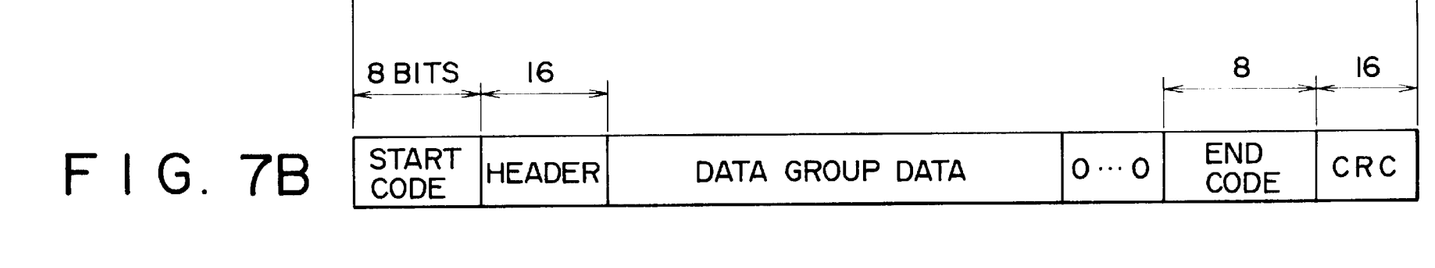

Further, as shown in FIG. 7B, 8 bits at the head of the data group represent a heading start code showing the start of that data group, the following 16 bits are a data group header having a flag showing the existence of linkage of data groups and the byte number of the following data group data. Furthermore, null codes for adjusting the length of the data group to integer times of 18 bytes follows the data group data, then a data group end code showing the end of the data group follows, and finally a CRC code for detecting errors of the data group follows.

Figure 8A:
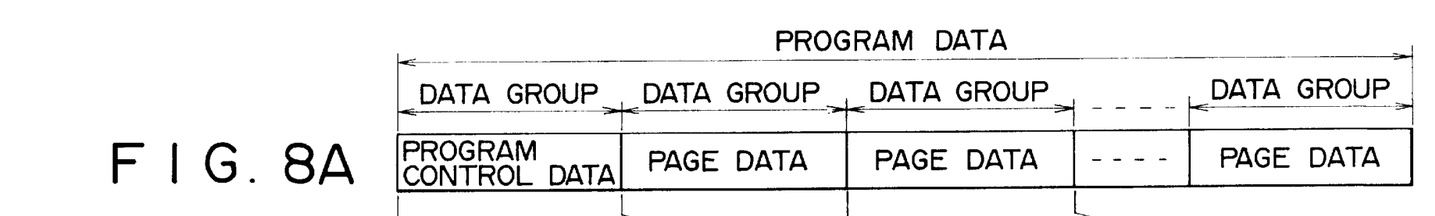

Further, one program is composed of one program data, but, as shown in FIG. 8A, the program data are composed of a plurality of data groups, the data group at the head is program control data and all of the remaining data groups are page data.

Figure 8B:
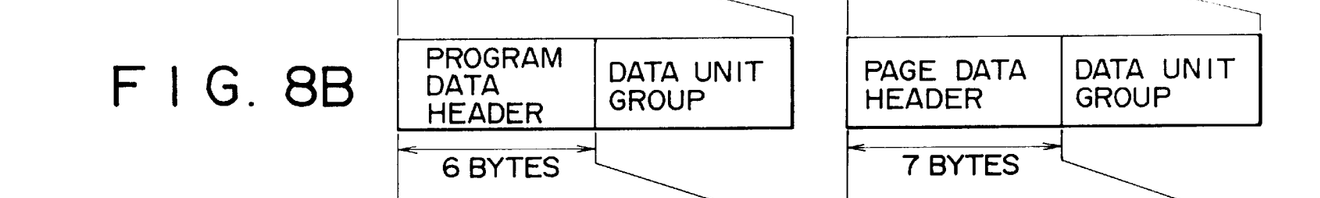
Figure 8C:
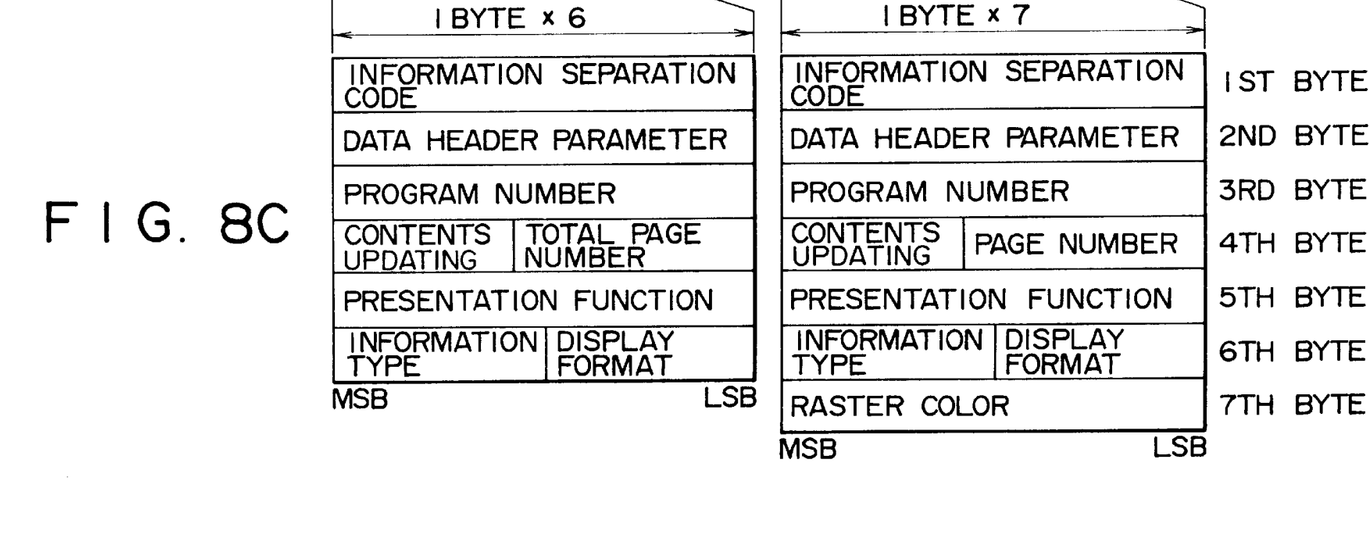

Further, the program control data are composed of a program data header in 6 bytes and a data unit group as shown in the left portion of FIG. 8B. Then, the program data header has such data as shown in the left portion of FIG. 8C, but, for example, the third byte shows a program number, 6 bits in the lower position of the fourth byte shows the total number of pages of the program, the fifth byte shows a presentation function and 4-bits in the higher position of the sixth byte shows an information type.

Figure 9:
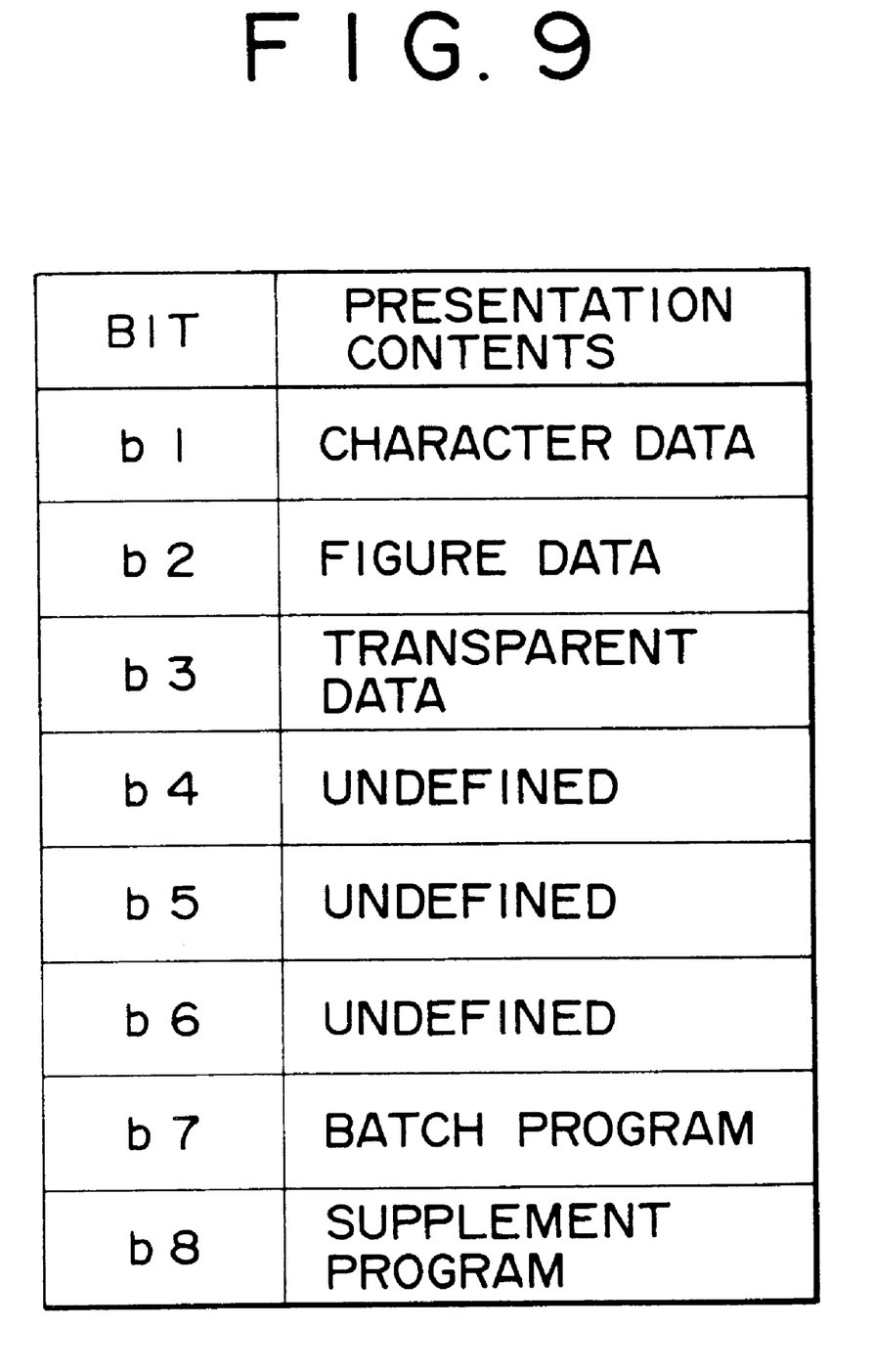
FIG. 9 is a diagram for explaining the signal format.

Besides, the presentation function at the fifth byte shows a type of the code included in the program and the function of display, and respective bits are assigned as shown in FIG. 9. For example, the first bit (LSB) becomes "1" in the case of character data, and the second bit becomes "1" in the case of figure data. Further, for a general program, all data of the program are received, and displayed sequentially from the first page, and for a non-general program, even when all data of the program cannot be received, display is made sequentially from a page that can be displayed.

The information type in 4 bits in the higher position of the sixth byte shows whether the information is free of charge or charged and so on.

Figure 10:
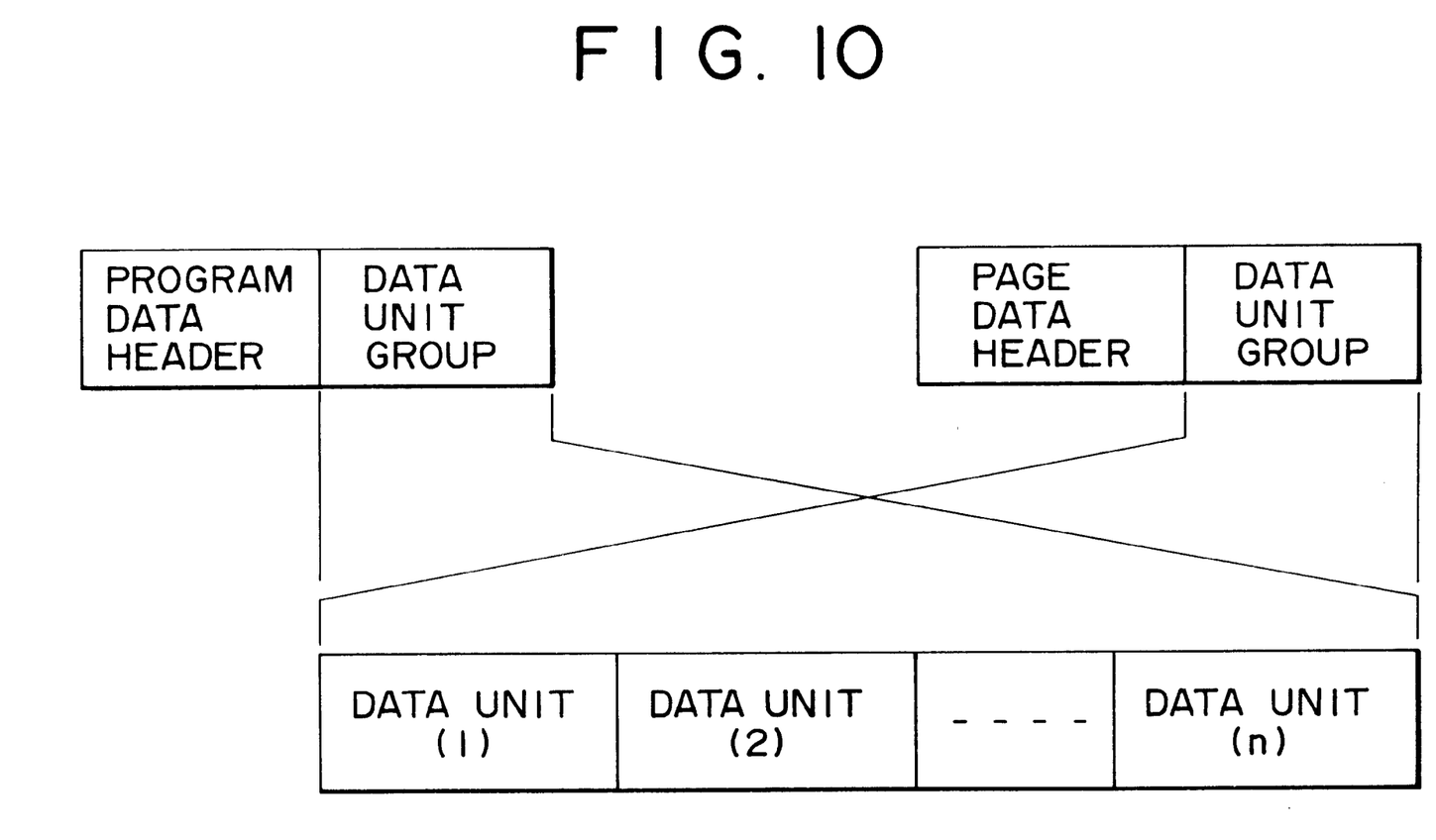
FIG. 10 is a diagram for explaining the signal format.

Further, the data unit group is composed of a plurality of data units having character data and figure data for display as shown in FIG. 10. Besides, one of these data units is used as a selection control data unit, and includes a key-in number, a destination page number, a destination program number, a destination service identity code and so on.

Furthermore, the page data are composed of a page data header in 7 bytes and a data unit group as shown in the right portion of FIG. 8B. In this case, the page data header has such data as shown in the right portion of FIG. 8C, wherein the third byte shows a program number, 6 bits in the lower position of the fourth byte show a page number in that program, the fifth byte shows a presentation function and 4 bits in the higher position of the sixth byte show an information type.

The foregoing expresses a format in text-based multiplex broadcasts by a DARC method.

Figure 11:
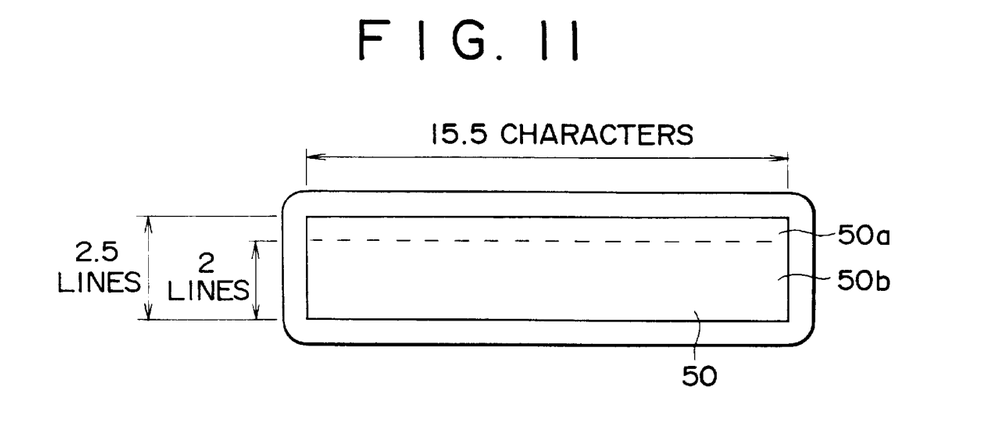
FIG. 11 is a diagram for explaining a display screen.

Further, as described above and as shown in FIG. 11, the receiver compatible with level 1 has a display element 50 such as an LCD having a display screen capable of displaying 15.5 characters×2.5 lines (248 dots in width by 44 dots in length). However, in the display screen of the display element 50, the 0.5 line portion of the upper portion of the display screen 50a is for displaying a header text, and the 2 lines portion of the lower portion is a text display screen 50b.

Figure 12A:
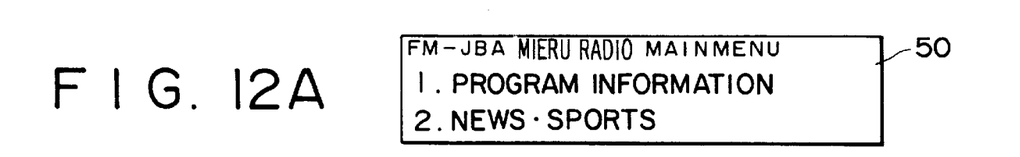
FIGS. 12A to 12D show diagrams for explaining display screens.

When the receiver receives text-based multiplex broadcasts, the main menu is displayed on the display element 50 as shown in FIG. 12A. Here, FIG. 12A shows a state that the main menu covers a plurality of pages and first one page among them is displayed. Besides, displayed on the display screen 50a of the header text are the broadcasting station name which is broadcasting the text-based multiplex broadcast which is currently being received by the receiver, the service (company) name of the text-based multiplex broadcast, and the menu name.

Figure 12B:
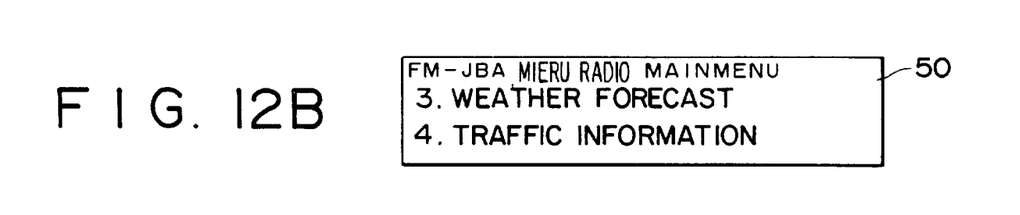

When a predetermined key operation is performed in such a state, the next page is displayed on the text display screen 50b as shown in FIG. 12B.

Figure 12C:
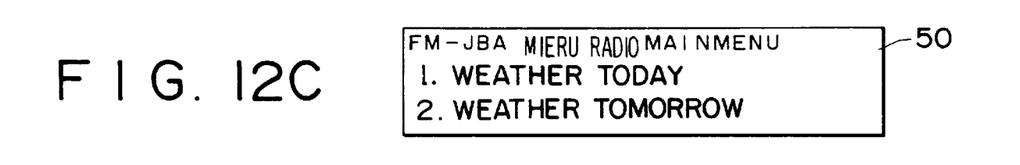

When the user decides upon the number of an item that the user wishes to see from the main menu, then the menu of the selected item is further made to be displayed. For example, when the user selects "3. WEATHER FORECAST" from within the main menu, then the contents "1. TODAY'S WEATHER", "2. TOMORROW'S WEATHER" are displayed as shown in FIG. 12C.

Figure 12D:
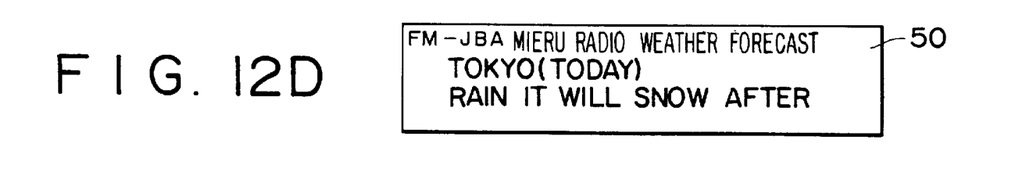
Figure 13A:
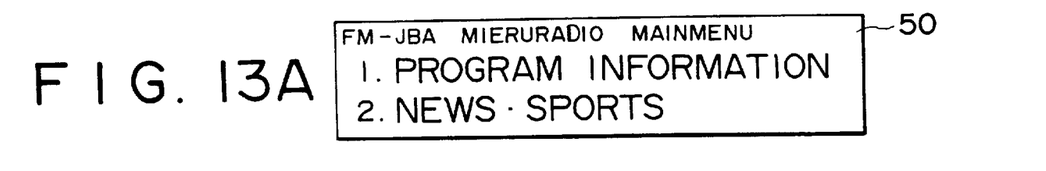
FIGS. 13A to 13D show diagrams for explaining display screens corresponding to FIG. 12.
Figure 13B:
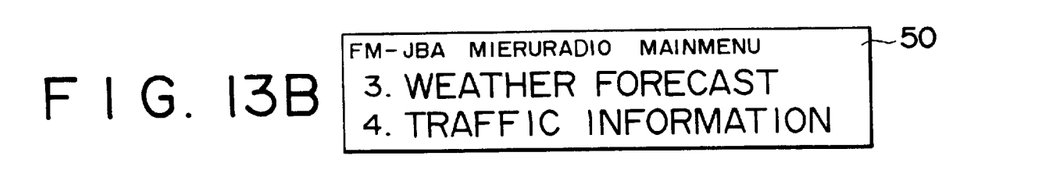
Figure 13C:
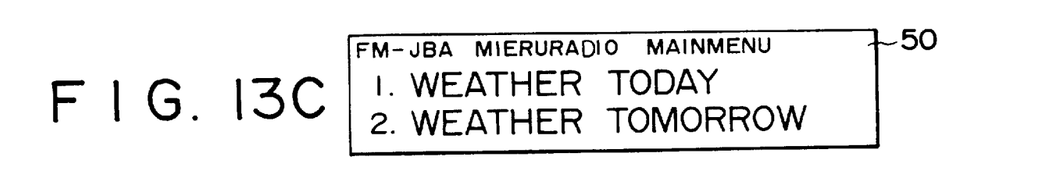
Figure 13D:
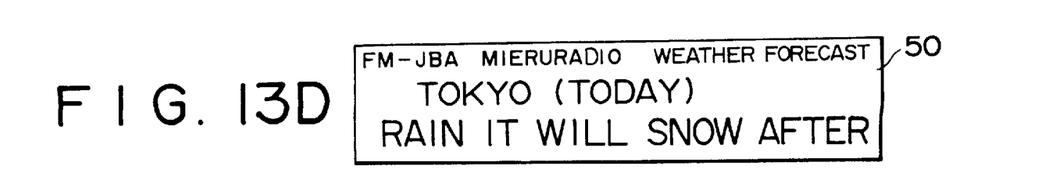

Furthermore, when the user decides upon the number of an item that the user wishes to see from within the menu, then the first page of the selected item is made to be displayed. For example, when the user selects "1. TODAY'S WEATHER" from the menu, specific character information relating to the "1. TODAY'S WEATHER" is displayed, as shown in FIG. 12D.

Besides, FIGS. 12A to 12D show displays in Japanese in compliance with the JIS standard. For reference, the displays of FIGS. 12A to 12D in English are shown in FIGS. 13A to 13D, respectively.

As described above, there are sequential reception processing and record reception processing in the FM text-based multiplex broadcast, and a broadcasting station controls the display timing in the case of a program of sequential reception processing. As a result, automatic page feed is carried out for the display of programs.

As against the above, in the case of a program of record reception processing, the display is not altered even when all the data required for display are received, and page feed is made when the user performs key operation. Namely, manual page feed is started.

However, it is inconvenient in use in case the method of page feed is different depending on the program.

SUMMARY OF THE INVENTION

The present invention aims to solve the above-described problems.

To this end, according to the present invention, there is provided a receiver comprising: a receiving circuit for receiving text-based multiplex broadcast; a memory for storing character data received by this receiving circuit; and a display element, wherein the character data stored in the memory are displayed, assuming that the display capacity of the display element is one page, on the display element one page at a time, and the display of one page at a time is changed over automatically to the next page at intervals of predetermined period of time.

Thus, when a program is selected, automatic page feed is performed even when the program is a program of record reception processing.

BRIEF DESCRIPTION OF THE DRAWINGS

FIGS. 8A to 8D are diagrams for explaining the signal format;

DESCRIPTION OF THE PREFERRED EMBODIMENT

Figure 1:
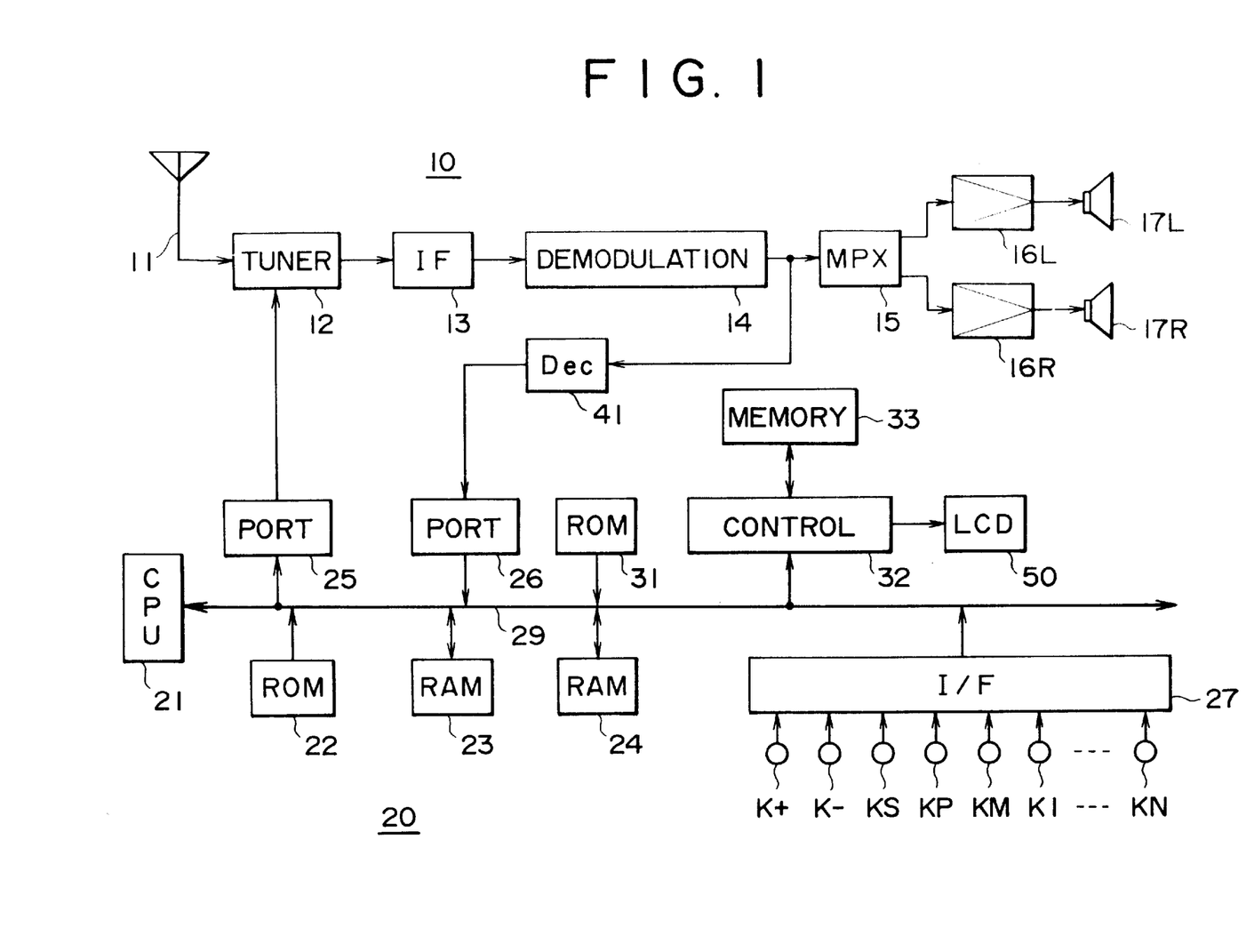
FIG. 1 is a system diagram showing a configuration of the present invention.

FIG. 1 shows the case of a level 1 compatible FM receiver according to an embodiment of the present invention.

A reference numeral 10 represents the FM receiving circuit, in which an FM signal received by an antenna 11 is provided to a tuner circuit 12 of a synthesizer method, whereby a broadcasting station of the desired frequency is selected and the FM signal is converted into an intermediate signal. The intermediate signal is provided to an FM demodulation circuit 14 via an intermediate frequency circuit 13 having an intermediate frequency filter and a wide band amplifier.

Then, taken out from the FM demodulation circuit 14 is a frequency multiplexed signal of a DSB signal which is balance-modulated with a sum signal (L+R) and a difference signal (L−R) of the left and right channels of stereo audio signals L and R, a pilot signal, and the LMSK signal in the above described FM text-based multiplex broadcast.

This frequency multiplexed signal is then provided to a stereo demodulation circuit 15 where left and right signals L and R are demodulated from the sum signal (L+R) and the DSB signal. These audio signals L and R are then provided to left and right channel speakers 17L and 17R via amplifiers 16L and 16R, respectively.

Further, this FM receiver is provided with a microcomputer 20 as control means for selecting a station in the tuner circuit 12 and for displaying characters through an FM text-based multiplex broadcast. A model MSM-65516 manufactured by Oki Electric Industry Co., Ltd. was used as this microcomputer 20.

This microcomputer 20 comprises a CPU 21 for executing programs, a ROM 22 used for the programs, a RAM 23 used as a work area, and a RAM 24 for use as a buffer for receiving FM text-based multiplex broadcast data. Further, these memories 22 to 24 are connected to the CPU 21 through a system bus 29.

Figure 2:
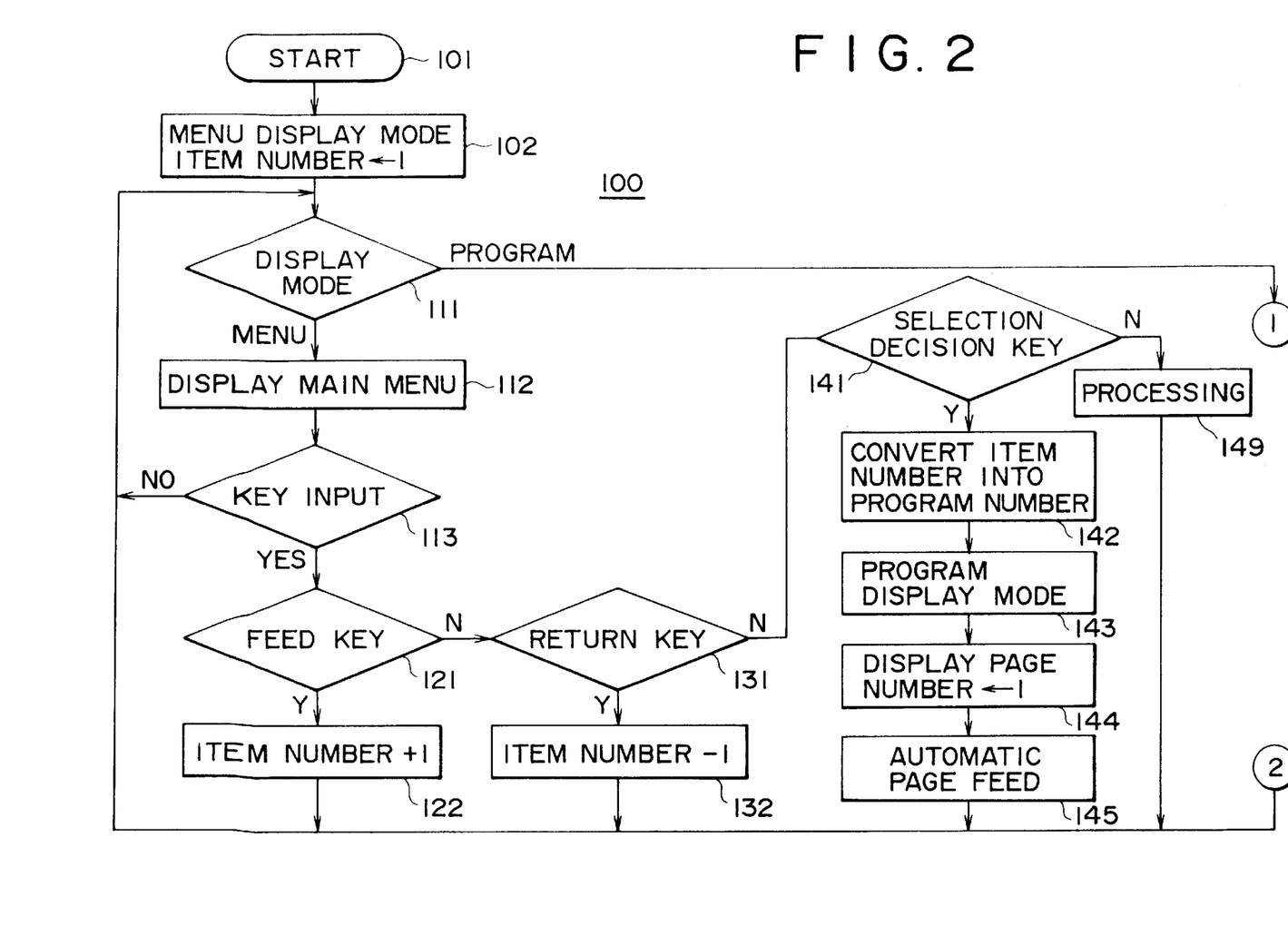
FIG. 2 is a flow chart showing a part of a configuration of the present invention.
Figure 3:
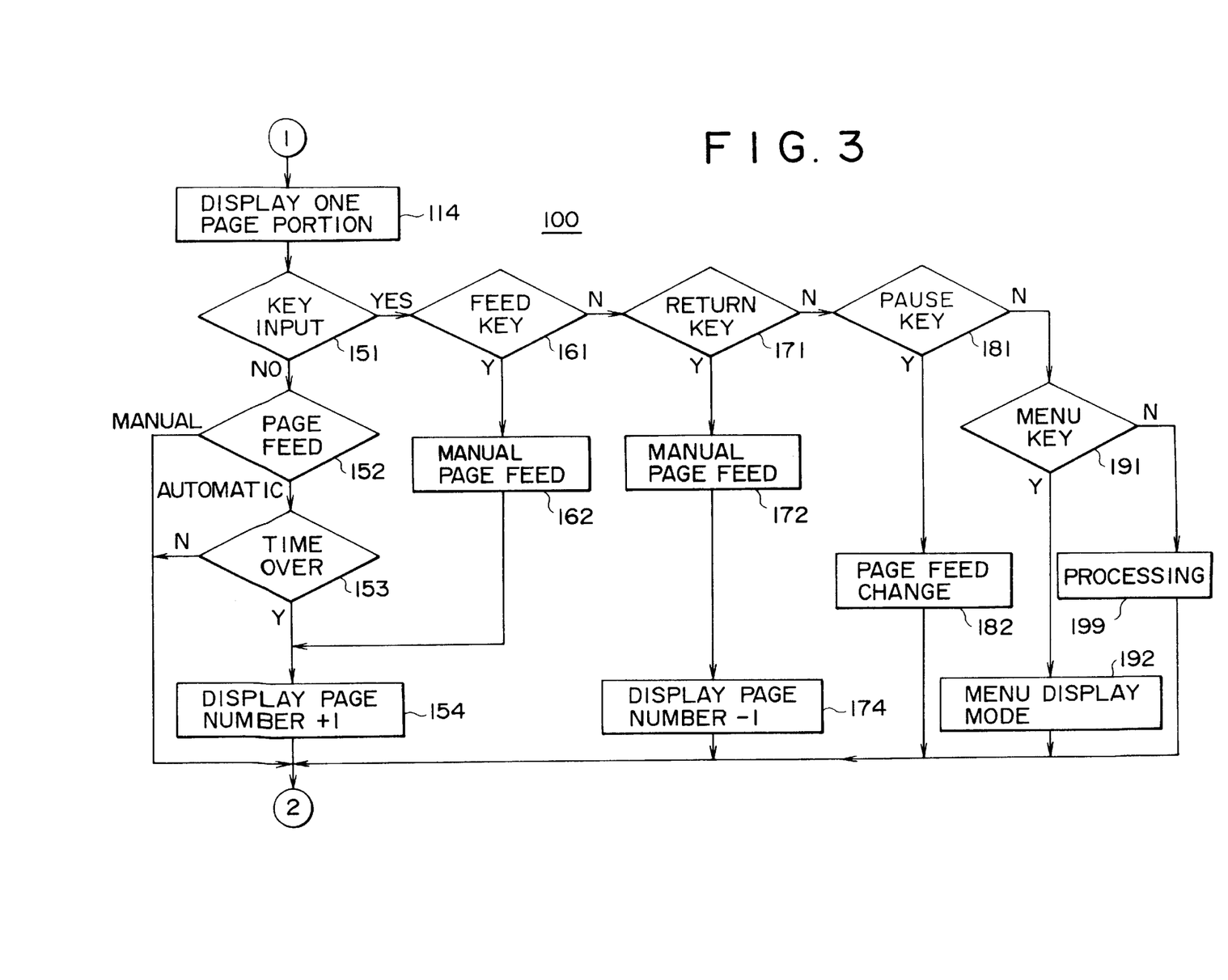
FIG. 3 is a flow chart showing a configuration continuing from FIG. 2.

In this case, prepared in the ROM 22 are various routines, as well as a routine 100 shown in FIG. 2 and FIG. 3 for instance. The routine 100 will be described in detail later, but it is for making respective displays in accordance with key operation. Besides, the routine 100 is shown only at a portion related to the key input and the display of a program of record reception processing for the sake of simplicity.

Furthermore, ports 25 and 26 and an interface circuit 27 are connected to the system bus 29. Data for selecting a station are provided to the tuner circuit 12 from the port 25, and station selection is made. A demodulation signal from the demodulation circuit 14 is provided to a decoding circuit 41 whereby data in the FM text-based multiplex broadcast are decoded, error corrected and taken out from the LMSK signal. These data are provided to the microcomputer 20 through the port 26.

Further, various operation keys K+, K−, KS, KP, KM, Kl to KN which are made up of non-lock type push switches are connected to the interface circuit 27, and the key outputs are inputted to the microcomputer 20.

Further, connected to the system bus 29 are a font ROM (character generator) 31 having font data for converting character data received through an FM text-based multiplex broadcast into display data, as well as a display controller 32.

A memory 33 for display use is connected to the controller 32, with, for example, an LCD being connected thereto as a display element 50. The display element 50 displays various characters or the like with dots, but it has similar display capacity to that of the display element DSP explained in FIG. 11 for instance, and has a display screen capable of displaying 15.5 characters×2.5 lines (248 dots in width by 44 dots in length).

Furthermore, the memory 33 adopts a bit map method compatible with the dot display method of the display element 50 and has a capacity for one screen. Then, data stored in the RAM 24 for a reception buffer are read out by the CPU 21, the read-out data are converted into display data using the font data of the ROM 31, and these display data are written in the memory 33 through the controller 32.

At this time, the display data of the memory 33 are repeatedly read out by the controller 32 and converted into display signals and provided to the display element 50. Therefore, characters or the like based on the data read out from the RAM 24 by the CPU 21 are displayed on the display element 50.

With such a construction, when a text-based multiplex broadcast is received, and the character data thereof are written in the RAM 24, thus making it possible to display a program, processing by the CPU 21 is started from a step 101 of the routine 100. Then, in a next step 102, a mode flag MODF is set to "0" and the item number is set to "1" at the same time.

In this case, the mode flag MODF operates so as to display the main menu (menu display mode) when MODF="0", and to display a program (program display mode) when MODF="1". Further, the item numbers are consecutive numbers assigned to each program name in the main menu, and indicate the name of an objective program when a program is selected.

Then, processing advances to a step 111, and in this step 111, the mode flag MODF is checked. When MODF="0" (menu display mode), processing advances from the step 111 to a step 112, and, in this step 112, names of two programs corresponding to the item number among the main menu are displayed on the display element 50.

Figure 4A:
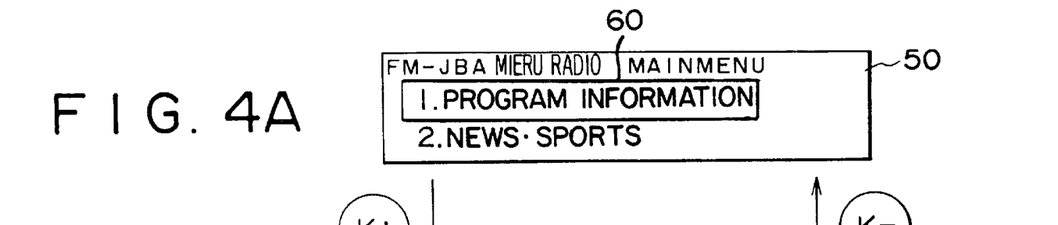
FIGS. 4A to 4D are diagrams for explaining a display state.

Since the item number is "1" in this case, for example, as shown in FIG. 4A, the first program name among the main menu and the second program name following the first program name are displayed, with the first program name being surrounded with a frame display 60 to show that the first program is the object of selection.

Next, processing advances to a step 113, and, in this step 113, it is checked whether any of the keys K+ to KN is being pushed or not. Then, when it is not being pushed, processing returns to the step 111 from the step 113. Accordingly, when there is no key input, the display state of the main menu is continued.

When the step 113 is executed, however, processing proceeds to a step 121 from the step 113 when any of the keys K+ to KN is being pushed, and, in this step 121, it is checked whether the key which is being pushed is the page feed key K+ or not.

Figure 4B:
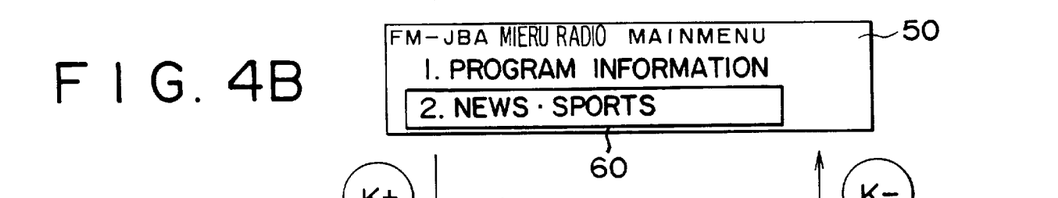

In the case of the page feed key K+, processing proceeds to a step 122 from the step 121, and, in this step 122, the item number is incremented by "1", and processing returns to the step 111 thereafter. Thus, since the item number is "2" in this case, the first program name among the main menu and the second program name following the first program name are displayed on the display element 50 through the step 112, with the second program name being displayed with designation by surrounding it with the frame 60 as shown in FIG. 4B for instance.

Figure 4C:
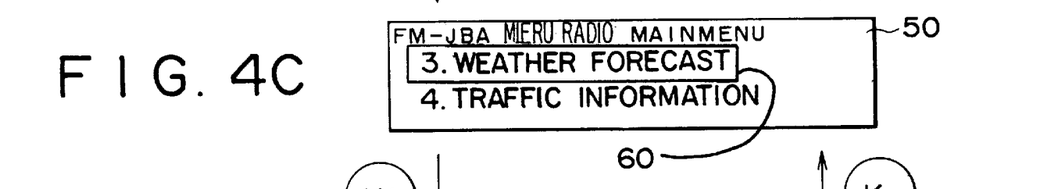
Figure 4D:
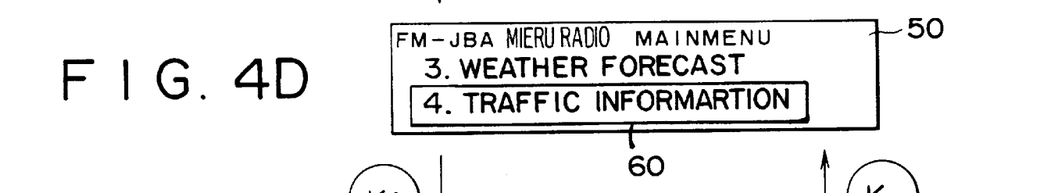
Figure 4E:
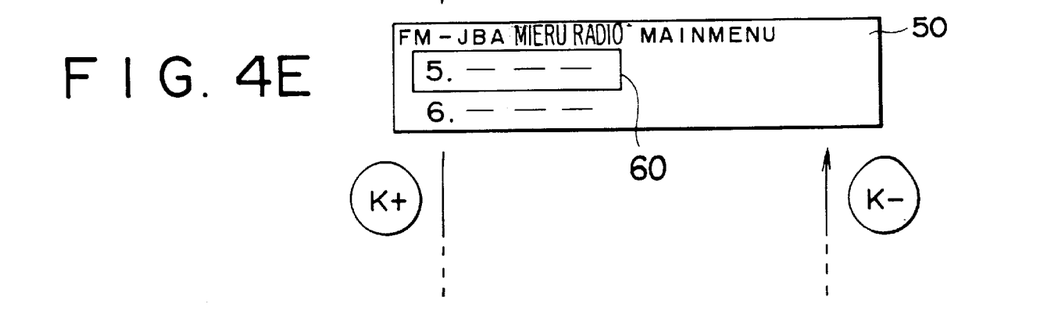

This way, when the page feed key K+ is pushed, the item number is incremented by "1" every time it is pushed, and the program name of the program which becomes the object of selection is displayed inversely in a positive order. Besides, when the item number changes from "2" to "3" for instance, the third and the fourth program names among the main menu are displayed and the third program name is also displayed inversely, as shown in FIGS. 4B and 4C. Namely, in the step 112, when the item number changes from an even number to an odd number by means of the page feed key K+, two program names are updated collectively.

When the page feed key K+ is pushed, the display of the main menu changes in a forward direction, and the designated display which shows a program that becomes the object of selection also changes in a forward direction as shown in FIG. 4.

Further, when the pushed key is not the page feed key K+ in the step 121, processing proceeds to a step 131 from the step 121, and, in this step 131, it is checked whether the pushed key is the page return key K− or not.

When the pushed key is the page return key K−, processing proceeds to a step 132 from the step 131, and, in this step 132, the item number is decremented by "1", and processing returns to the step 111 thereafter. Therefore, when it is assumed that the item number is "3", the third program name and the fourth program name following the third program name among the main menu are displayed on the display element 50 and the third program name is displayed with designation in the step 112, as shown in FIG. 4C for instance.

This way, when the page return key K− is pushed, the item number is decremented by "1" every time it is pushed, and the program name of a program which becomes the object of selection is displayed inversely in a reverse order. Besides, when the program number changes from "3" to "2", the first and the second program names among the main menu are displayed and the second program name is also displayed with designation, as shown in FIGS. 4C and 4B. Namely, in the step 112, when the item number changes from an odd number to an even number by means of the page return key K−, two program names are updated collectively.

Thus, when the page return key K− is pushed, the display of the main menu changes in a reverse direction, and inverse display which shows a program which becomes an object of selection also changes in a reverse direction, as shown in FIG. 4.

Therefore, when the page feed key K+ or the page return key K− is pushed when the main menu is being displayed on the display element 50, an optional program name included in the main menu can be designated (displayed by surrounding with a frame 60).

Further, when a selection determination key KS is pushed when the program name of a selected program is being displayed inversely, processing proceeds to a step 141 through (the step 113)→(the step 121)→(the step 131), and, in this step 141, it is checked whether the pushed key is the selection determination key KS or not.

Since the pushed key is the selection determination key KS in this case, processing proceeds to a step 142 from the step 141, and, in this step 142, the present item number is converted into a program number corresponding thereto. Next, in a step 143, the mode flag MODF is changed to "1" (program display mode).

Furthermore, processing proceeds to a step 144, and, in this step 144, the display page number is set to "1". This display page number shows the page number when a program is displayed on the display element 50. Since the page number has been set to "1" in this case, the first page is displayed when a program is displayed.

Then, processing proceeds to a step 145, and, in this step 145, a display flag DSPF is set to "1". When a program of record reception processing which is not applied with automatic page feed is displayed, this display flag DSPF shows whether the display is set to automatic page feed or manual page feed, and automatic page feed is set when DSPF="1" and manual page feed is set when DSPF="0". Thus, in the step 145, page feed is set to the automatic page feed.

Thereafter, processing returns to the step 111. In this way, when a selected program is designated through the steps 121 to 132 and the selection determination key KS is pushed thereafter, the program number of the program is acquired, and preprocessing for displaying the program with automatic page feed is executed.

Besides, when it is detected in the step 113 that keys other than the keys K+, K− and KS have been pushed, processing proceeds to a step 149 from the step 141, and, in this step 149, processing corresponding to the pushed key is executed, and processing by the CPU 21 returns to the step 111 thereafter.

When the selected program is designated as described above and processing returns to the step 111 after preprocessing is executed, then MODF="1" (program display mode) is set by the step 143.

Accordingly, processing by the CPU 21 proceeds to a step 114 from the step 111, and, in this step 114, one page having a page number shown by the displayed page number which is a page of a program having a program number acquired in the step 142 is displayed on the display element 50. In this case, since the display page number is set to "1" in a step 144, the first page is displayed.

Then, processing proceeds to a step 151, and, in this step 151, it is checked whether any of the keys K+ to KN is being pushed or not. Then, when no key is being pushed, processing proceeds to a step 152 from the step 151, and, in this step 152, the display flag DSPF is checked.

Since DSPF="1" (automatic page feed) is set in a step 145, processing proceeds to a step 153 from the step 152, and, in this step 153, it is checked whether a predetermined amount of time such as 5 seconds has elapsed or not after the page being displayed presently has first become displayed. Then, when 5 seconds have not elapsed, processing returns from the step 153 to the step 111.

Accordingly, the above-mentioned processing is repeated until 5 seconds elapse after the page which is being presently displayed first becomes displayed. As a result, the page which is being displayed presently is displayed for 5 seconds.

Further, when 5 seconds elapse, it is decided in the step 153, and processing proceeds to a step 154 from the step 153. In this step 154, the display page number is incremented by "1", and processing returns to the step 111 thereafter. Thus, since the display page number shows "2" and the step 114 is also executed in this case, the second page is displayed for the program displayed on the display element 50. When there is no key input thereafter, processing proceeds to the steps 151 to step 153.

Therefore, when the keys K+ to KN are not pushed, a page is fed every five seconds for the program displayed on the display element 50, that is, automatic page feed is performed. Thus, automatic page feed is performed even for a program of record reception processing which is originally a program for which automatic page feed is not performed.

Further, when any of the keys K+ to KN is pushed when display is made by automatic page feed as described above, it is decided in the step 151, and processing proceeds to a step 161 from the step 151, and, in this step 161, it is checked whether the pushed key is the page feed key K+ or not.

When the pushed key is the page feed key K+, processing proceeds to a step 162 from the step 161, and, in this step 162, the display flag DSPF is set to "0" (manual page feed). Thereafter, processing advances to a step 154, the display page number is incremented by "1" and the processing returns to the step 111.

Therefore, the next page when the page feed key K+ is pushed is displayed in the step 114 in this case, and processing proceeds to the step 151.

Then, in this case, when there is no key input, processing also proceeds to a step 152 from the step 114 through the step 151. Since DSPF="0" (manual page feed) at this time, however, processing returns to the step 111 skipping the steps 153 and 154.

Therefore, when the page feed key K+ is pushed when automatic page feed is being performed, the automatic page feed is canceled, the next page is displayed, and that page continues to be displayed as it is at the same time.

Further, when the page feed key K+ is pushed again in such a state, the steps 154 and 114 are executed every time it is pushed. Therefore, a next page of a program which is being displayed is started every time it is pushed. Namely, it becomes possible to feed a page by manual operation.

Thus, when the page feed key K+ is pushed while automatic page feed is being made, the automatic page feed is canceled, and it becomes possible thereafter to feed the page by manual operation.

Further, in the step 161, when the pushed key is not the page feed key K+, processing proceeds to a step 171 from the step 161, and, in this step 171, it is checked whether the pushed key is the page return key K− or not.

Then, when the pushed key is the page return key K−, processing proceeds to a step 172 from the step 171, and, in this step 172, the display flag DSPF is set to "0" (manual page feed). Then, processing proceeds to a step 174, and, in this step 174, the display page number is decremented by "1", and processing returns to the step 111 thereafter.

Accordingly, when the page return key K− is pushed while automatic page feed is being made, automatic page feed is canceled and a previous page is displayed, and that page continues to be displayed as it is. Thereafter, the page of the program which is being displayed is changed to the previous page every time the page return key K− is pushed similarly to the case that the page feed key K+ is pushed.

Thus, when the page return key K− is pushed while automatic page feed is being made, the automatic page feed is canceled, and it becomes possible thereafter to return to the previously displayed page by manual operation.

Furthermore, when a pause key KP is pushed in the case of automatic page feed (DSPF="1") or in the case of manual page feed (DSPF="0"), processing advances to a step 181 through (the step 151)→(the step 161)→(the step 171), and, in this step 181, it is checked whether the pushed key is the pause key KP or not.

Since the pushed key is the pause key in this case, processing proceeds to a step 182 from the step 181, and, in this step 182, the display flag DSPF is inverted, that is to say, DSPF="0" is set when DSPF="1" and DSPF="1" is set when DSPF="0", and processing returns to the step 111 thereafter.

Accordingly, if the pause key KP is pushed in the case of automatic page feed (DSPF="1"), the automatic page feed is canceled, and manual page feed is performed thereafter. Further, if the pause key KP was pushed in the case of manual page feed (DSPF="0"), the manual page feed is canceled and automatic page feed is performed thereafter.

Otherwise, if the pause key KP was pushed in the case of automatic page feed, the automatic page feed is canceled and manual page feed is performed thereafter. Thus, it means that the automatic page feed has been brought to a pause state (temporary stop mode). Further, when the pause key is pushed once more again, the automatic page feed is started again. Thus, it means that the pause state is canceled.

Further, even when the automatic page feed is canceled and manual page feed is started by pushing the keys K+ and K−, the automatic page feed is started again when the pause key KP is pushed.

Furthermore, when a menu key KM is pushed in the case of automatic page feed or in the case of manual page feed, processing proceeds to a step 191 through the step 151 the step 161 the step 171 the step 181, and in this step 191, it is checked whether the pushed key is the menu key KM or not.

Since the pushed key is the menu key KM in this case, processing proceeds to a step 192 from the step 191, and in this step 192, the mode flag MODF is set to "0" (menu display mode), and processing returns to the step 111 thereafter. Thus, the main menu is displayed on the LCD 50 thereafter.

Besides, when it is detected in the step 151 that keys other than the keys K+, K−, KP and KM have been pushed, processing proceeds to a step 199 from the step 191, and in this step 199, processing corresponding to the pushed key is executed, and processing by the CPU 21 returns to the step 111 thereafter.

Thus, it is possible to realize various display states by means of key operation in the receiver shown in FIG. 1. In this case, automatic page feed is executed even for a program of record reception processing in which automatic page feed is not performed originally. Moreover, the automatic page feed thereof is the default, it is possible to look at a character program with feeling same as for a program of sequential reception processing, and automatic page feed is performed for every program. Thus, it is convenient in use.

Furthermore, when the key K+, K− or KP is pushed when automatic page feed is made on a program of record reception processing, it is possible to cancel the automatic page feed or to bring it into a pause state, thus further improving convenience in use.

Besides, it is also possible to use the selection determination key KS and the pause key KP for the same purpose in the above-mentioned statement. Further, the level 2 is a service for a receiver capable of displaying 15.5 characters× 8.5 lines including the header portion, but, when it is displayed on the display element 50, it is sufficient to divide the first line to the fourteenth line of the text into two lines at a time (one line in the fifteenth line only), and to display them on the display element 50 regarding these two lines as one page.

Besides, in FIG. 4, the number and the characters surrounded with a frame 60 is designated, but it may be arranged so that only the number is surrounded with the frame 60, or it is also possible to achieve more conspicuous display by making the ground of the portion surrounded with the indication of a frame shown in FIG. 4 black in color, and making the number and the characters void.

According to the present invention, since automatic page feed is performed with default even for a program of record reception processing in which automatic page feed is not performed originally, it is possible to see a character program with the same feeling as that for the program of sequential reception processing and automatic page feed is performed on any program, thus resulting in convenience in use.

Furthermore, in the case of a program of record reception processing, it is also possible to cancel the automatic page feed or to bring into a pause state, thus further improving convenience in use.

What is claimed is:

1. A receiver for receiving FM text-based multiplex broadcasts comprising:

a receiving circuit for receiving FM text-based multiplex broadcasts;

a memory for storing character data received by said receiving circuit;

a display element for displaying said character data and having a display capacity of one page of character data;

page change specification means for receiving first user input requesting a page change; and control means for controlling the display element, including controlling the displaying of said character data stored in said memory on said display element one page at a time in one of an automatic page feed mode and a manual page feed mode, said control means having page feed mode toggling means for receiving second user input and in response to said received second user input changing a page feed mode from a current one of said automatic page feed mode and said manual page feed mode to other of said automatic page feed mode and said manual page feed mode;

wherein said receiver starts in a default page feed mode of said automatic page feed mode, in which the display of one page is changed over only automatically to a next page at every predetermined amount of time but is not changed over to another page in response to the first user input, and said page feed mode is changed by said page feed mode toggling means, in response to said second user input, to said manual page feed mode, in which said control means changes the display of one page over to another page only when said page change specification means receives said first user input.

2. The receiver for receiving FM text-based multiplex broadcasts according to claim 1, said page change specification means comprising an automatic operation cancellation change-over key connected to an interface circuit of said control means, wherein an automatic change-over is canceled when said automatic operation cancellation change-over key is operated when said automatic change-over is in an active state, and said automatic change-over is executed when said automatic operation cancellation change-over key is operated when the automatic change-over is in an inactive state.

3. The receiver for receiving FM text-based multiplex broadcasts according to claim 1, said page change specification means comprising a page feed key and a page return key connected to an interface circuit of said control means, wherein the automatic change-over of the page is canceled when said page feed key is operated, the next page is displayed on said display element every time said page feed key is operated, the automatic change-over of the page is canceled when said page return key is operated, and a previous page is displayed on said display element every time said page return key is operated.

4. The receiver for receiving FM text-based multiplex broadcasts according to claim 3, said page change specification means further comprising an automatic operation cancellation change-over key connected to said interface circuit of said control means, wherein said automatic change-over is canceled when said automatic operation cancellation change-over key is operated when said automatic change-over is in an active state, and said automatic change-over is executed when said automatic operation cancellation change-over key is operated when the automatic change-over is in an inactive state.

* * * * *